(12) United States Patent
Kato

(10) Patent No.: US 6,259,816 B1
(45) Date of Patent: Jul. 10, 2001

(54) MOVING PICTURE COMPRESSING SYSTEM CAPABLE OF EFFECTIVELY EXECUTING COMPRESSIVE-ENCODING OF A VIDEO SIGNAL IN RESPONSE TO AN ATTITUDE OF A CAMERA PLATFORM

(75) Inventor: Tatsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/205,783

(22) Filed: Dec. 4, 1998

(30) Foreign Application Priority Data

Dec. 4, 1997 (JP) ................................................ 9-333785

(51) Int. Cl.[7] ........................................................ G06K 9/36
(52) U.S. Cl. ............................ 382/236; 382/232; 382/238
(58) Field of Search .................................... 382/236, 238, 382/232, 141, 152; 348/95, 699

(56) References Cited

U.S. PATENT DOCUMENTS 3,749,830 * 7/1973 Blitchington, Jr. ..................... 348/95
5,579,444 * 11/1996 Dalziel et al. .......................... 395/94
5,872,604 * 2/1999 Ogura .................................... 348/699
5,886,742 * 3/1999 Hibi et al. .............................. 348/699
5,909,511 * 6/1999 Yoshimoto ............................. 382/236

FOREIGN PATENT DOCUMENTS

| 6-197332 | 7/1994 | (JP) | H04N/7/137 |
| 7-193822 | 7/1995 | (JP) | H04N/7/32 |
| 8-237660 | 9/1996 | (JP) | H04N/7/32 |
| 8-251592 | 9/1996 | (JP) | H04N/7/32 |
| 9-37269  | 2/1997 | (JP) | H04N/7/32 |

* cited by examiner

Primary Examiner—Jose L. Couso
Assistant Examiner—Anh Hong Do
(74) Attorney, Agent, or Firm—Ostrolenk, Faber, Gerb & Soffen, LLP

(57) ABSTRACT

A compressive encoder changes a search area in accordance with an attitude of a camera platform mounting a video camera on the platform. Responsive to a video signal from the video camera, the encoder executes compressive encoding together with motion compensation which uses motion vectors found out within the changed search area. Thus, the possibility that the motion vectors are founded out within the changed search area becomes high and effective compressive-encoding is achieved.

12 Claims, 5 Drawing Sheets

MOVING PICTURE COMPRESSING SYSTEM CAPABLE OF EFFECTIVELY EXECUTING COMPRESSIVE-ENCODING OF A VIDEO SIGNAL IN RESPONSE TO AN ATTITUDE OF A CAMERA PLATFORM

BACKGROUND OF THE INVENTION

This invention relates to a moving picture compressing system and, more particularly, to efficient compressive-encoding which can cope with a variation of an attitude of a camera platform mounting a video camera.

Generally, a video signal has a large amount of data in comparison with an audio signal and is very often subjected to compressive-encoding when transmitted into a transmission line in order to prevent wasteful use of the resources, such as the frequency band.

For the purpose, various methods of compressive-encoding have been proposed. Among others, one standardized method is known as MPEG and another standardized method is defined in H.261 standardized by ITU-T for use in a videophone or a television conference.

In both the methods mentioned above, compressive-encoding has adopted motion compensation in order to increase a compression ratio and may be referred to as compressive-encoding with motion compensation.

In the compressive-encoding with motion compensation, a certain picture or frame which is selected as a particular picture is coded by referring to another picture as a reference picture.

Herein, description will be simply made about the compressive-encoding with motion compensation. At first, it is assumed that a common object is included in both the particular and reference pictures and is changed or moved in position in both the particular and the reference pictures. In this event, it is to be noted that both the particular and the reference pictures can be sufficiently decoded by the use of the reference picture and vectors which are representative of information concerned with positions between the particular and the reference pictures. Herein, such vectors are generally called motion vectors. From this fact, it is readily understood that motion compensation may be said as a technique which compensates motion of the object included in the particular picture by using motion vectors.

Herein, let consideration be made about extraction of such motion vectors from an image picked up by an image sensor or an image pickup device. In this case, such motion vectors are searched within a search area of the image sensor. Herein, it is noted that the search area has been fixed or has been determined by a complicated calculation. Such a complicated calculation may be exemplified by calculating a distribution probability of motion vectors within the search area. Specifically, judgement is made about whether or not the distribution probability of the motion vectors exceeds a predetermined value determined for an encoder. As long as the distribution probability exceeds the predetermined value, the search area is kept unchanged. Otherwise, the search area is not determined and, as a result, the motion vectors can also not be calculated in this image pickup device. Such techniques are disclosed in Japanese Unexamined Patent Publications (JP-A) Nos. 9-37269, 8-251592, 8-237660 and 7-193822, all which will be referred to as conventional techniques.

However, these conventional techniques are not always effective in all of uses and, as a result, effective compressive-encoding can not be often achieved in a specific use. Moreover, according to the conventional techniques, a compressive encoder is inevitably complex in structure to determine the search area.

SUMMARY OF THE INVENTION

It is therefore an object of the present invention to provide a moving picture compressing system which is capable of effectively executing compressive-encoding when it is applied for a particular use, such as a videophone and a television conference.

It is another object of the present invention to provide the above system which has a simple compressive encoder.

In order to resolve the above-mentioned problems of the conventional techniques, research has been directed to the particular use, such as a videophone and a television conference. As a result of research, it has been found out that the conventional techniques never consider a variation of an image area picked up by a video camera, an image sensor or an image pickup device.

Generally, a video camera is mounted on a camera platform and, therefore, the image area picked up by the video camera is changed together with the camera platform turning or movement. In this event, the above conventional techniques can determine no motion vectors when the present search area is largely changed to another. This is because a distribution probability of motion vectors exceed a predetermined value. As a result, the conventional techniques can not execute compressive-encoding with motion compensation and inevitably executes compressive-encoding of an Intra-coded picture without motion compensation. Thus, according to the conventional techniques, effective compressive-encoding can not be achieved in the particular use, such as a videophone and a television conference.

Taking the above into consideration, compressive-encoding according to this invention obtains a variation of an image area picked up by a video camera by some means, for instance, monitoring an attitude of a camera platform mounting the video camera and determines a search area in accordance with the variation of the image area. Moreover, compressive-encoding of a moving picture searches motion vectors within the determined search area and then executes the motion compensation which uses the motion vectors searched within the determined search area.

Furthermore, this invention provides a moving picture compressing system based on the above-mentioned approach so as to solve the above-mentioned problems and will be described in detail hereinafter.

According to the present invention, a moving picture compressing system has a video camera, a camera platform, a compressive encoder and a search area controller. The video camera is mounted on the camera platform and produces, as a video signal, a moving picture which has a sequence of pictures. Responsive to the video signal, the compressive encoder executes compressive-encoding together with motion compensation which uses motion vectors found out within a search area.

More particularly, the search area controller controls the search area of the compressive encoder, by transmitting, into the compressive encoder, an area control signal which corresponds to an attitude of the camera platform. Thus, in the present invention, the motion compensation executed by the compressive encoder uses motion vectors found within the search area which corresponds to the attitude of the camera platform. Therefore, the possibility that the motion vectors are found within the changed search area becomes high. As a result, an effective compressive-encoding is achieved. Moreover, the search area can be sufficiently changed by obtaining an attitude of the camera platform without quite intricate calculation. Therefore, the moving picture compressing system of this invention sufficiently has a simple compressive encoder.

DESCRIPTION OF THE PREFERRED EMBODIMENTS

Figure 1:
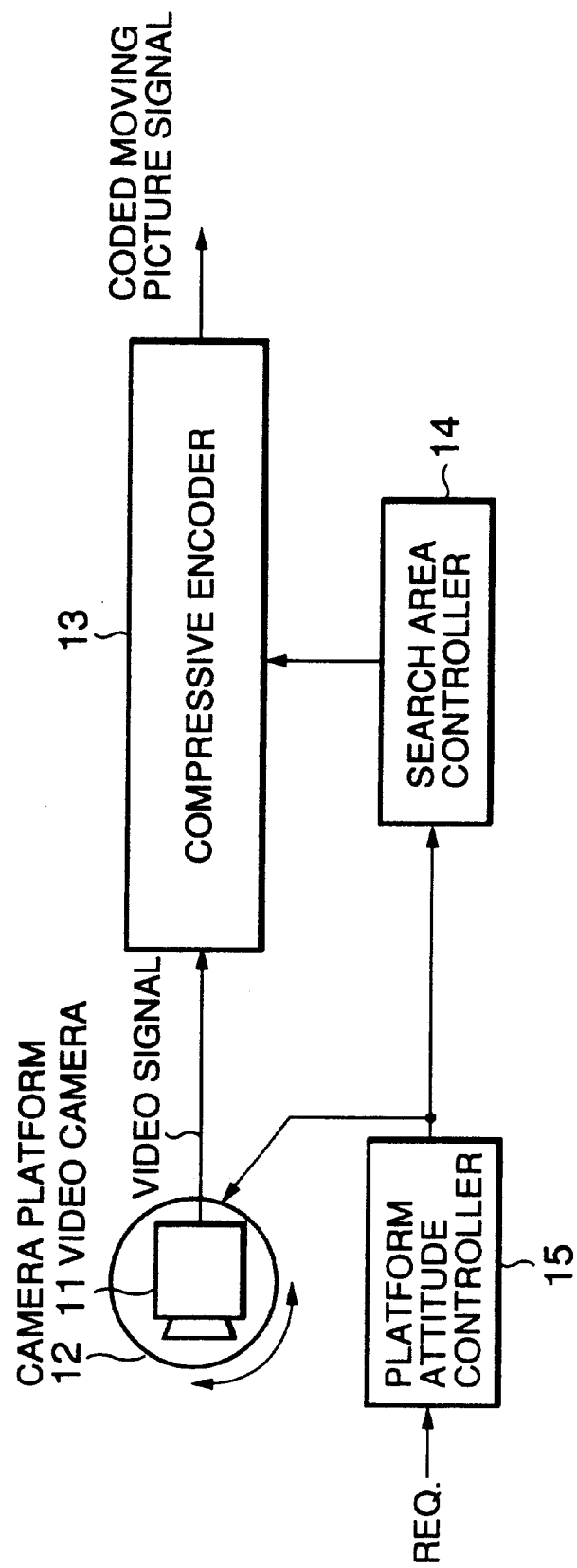
FIG. 1 shows a block diagram of a moving picture compressing system according to a preferred embodiment of this invention.

Referring to FIG. 1, a moving picture compressing system according to the preferred embodiment of this invention has a video camera 11, a camera platform 12, a compressive encoder 13, a search area controller 14, and a platform attitude controller 15.

In detail, the video camera 11 is mounted on the camera platform 12 and produces, as a video signal, a moving picture which has a sequence of pictures. The camera platform 12 is rotatable around a first axis and is also rotatable around a second axis orthogonal to the first axis with the video camera 11 mounted on the camera platform 12. In this embodiment, the first axis passes through a center of a circle depicted as the camera platform 12 in FIG. 4 and is vertical to a plane of the circle. Furthermore, the second axis passes through the center of the circle as the camera platform 12 and is parallel to a line extended from the front direction to the rear direction of the video camera 11.

In addition, the compressive encoder 13 receives the video signal from the video camera 11 and then executes compressive-encoding together with motion compensation to produce a coded moving picture signal. Herein, motion compensation uses motion vectors extracted from a search area which is defined as a predetermined search area at the beginning and which is controlled by the search area controller 14 as described hereinafter.

Moreover, the search area controller 14 sends, into the compressive encoder 13, an area control signal which corresponds to an attitude of the camera platform 12, and which controls the search area of the compressive encoder 13. Thus, the compressive encoder 13 can execute motion compensation by using motion vectors found out within the search area controlled in accordance with the attitude of the camera platform 12. Herein, for instance, the area control signal indicates to widen or move the search area of the compressive encoder 13. More specifically, the search area controller 14 detects the attitude of the camera platform 12 in cooperation with the platform attitude controller 15 in the preferred embodiment, as will be mentioned hereunder.

Responsive to a user request (depicted as "REQ." in FIG. 1), the platform attitude controller 15 transmits an attitude control signal to the camera platform 12 and, thereby, controls the attitude of the camera platform 12. In particular, the platform attitude controller 15 also transmits the attitude control signal to the search area controller 14. Thus, responsive to the attitude control signal, the search area controller 14 can control the search area of the compressive encoder 13 in correspondence with the attitude of the camera platform 12.

As described above, in the preferred embodiment, the motion compensation executed by the compressive encoder 13 uses motion vectors found out within the search area which corresponds to the attitude of the camera platform 12. Therefore, the possibility that the motion vectors are founded out within the changed search area becomes high. As a result, effective compressive-encoding is achieved in this embodiment. Moreover, the search area can be sufficiently changed by obtaining an attitude of the camera platform 12 without quite intricate calculation in the compressive encoder 13. Therefore, the compressive encoder 13 is very simple in structure in the moving picture compressing system of this invention.

Now, detail explanations will be made about operations of the above embodiment with reference to FIGS. 2 through 6 also.

Figure 2:
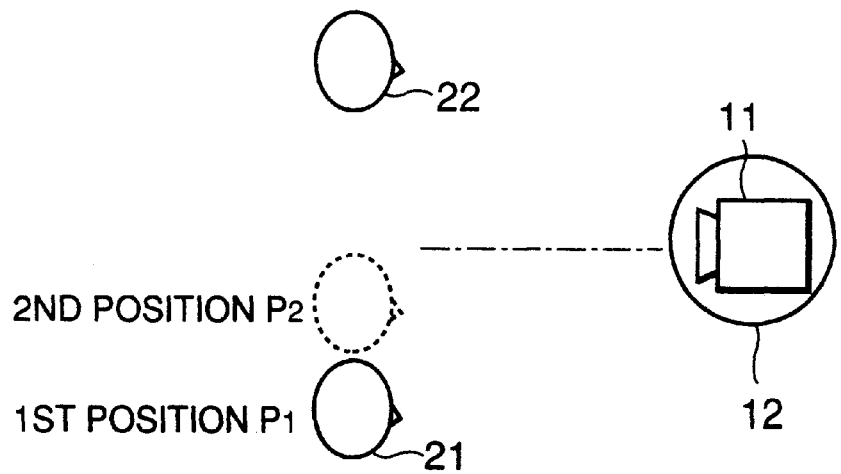
FIG. 2 shows a view for use in describing of a relationship between a front direction of a camera and objects.
Figure 3:
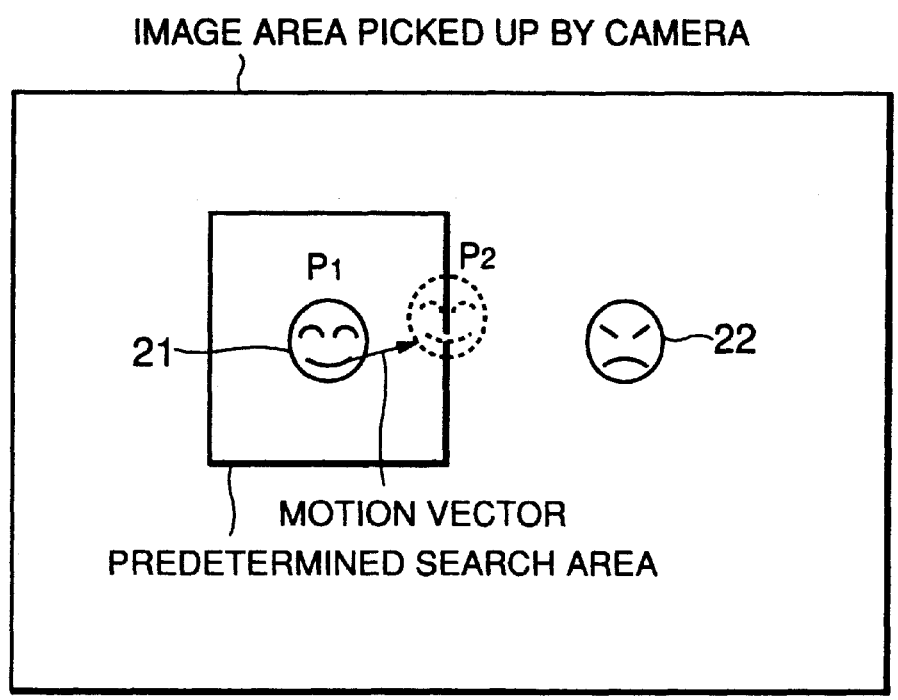
FIG. 3 shows a view for use in describing of a relationship between a search area and motion vectors within an image area picked up by the camera shown in FIG. 2.

Referring to FIG. 2, it is assumed that the video camera 11 mounted on the camera platform 12 picks up first and second objects 21 and 22 which are taken as the photographs, respectively, and which appear in a search area. In FIG. 2, it is also assumed that an operator neither gives any request to the platform attitude controller 15 nor changes the attitude of the camera platform 12. That is, the video camera 11 is at a standstill. It is further surmised that the first object 21 moves from a first position P1 to a second position P2 and, on the other hand, the second object 22 remains stationary while the video camera 11 is picking up.

Under the circumstances, the compressive encoder 13 searches or calculates a motion vector about the first object 21 within the search area on the basis of movement of the first object 21. Herein, the search area is kept unchanged, as mentioned above, because the camera platform does not rotate but is at a standstill. In this point, the system of this invention operates in a manner similar to the conventional techniques.

However, when the camera platform 12 rotates together with the video camera 11, the system of this invention executes particular operation different from that of the conventional techniques, as will be mentioned in detail hereinafter.

Figure 4:
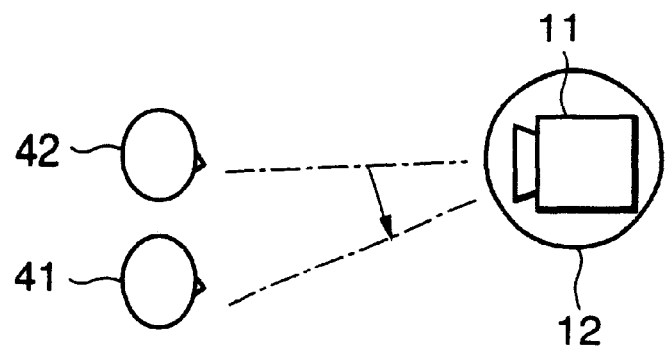
FIG. 4 shows a view for use in describing the front direction of a camera and objects when a platform is rotated.

Referring to FIG. 4, the video camera 11 mounted on the camera platform 12 picks up third and fourth objects 41 and 42. In FIG. 4, it is assumed that an operator issues a request to the platform attitude controller 15 to move the camera platform 12. In this connection, the platform attitude controller 15 produces the attitude control signal and transmits the same to both the camera platform 12 and the search area controller 14. Furthermore, it is assumed that the camera platform 12, responsive to the attitude control signal, rotates on the first axis counterclockwise till the third object 41 moves from a position P3 to another position near by a center P4 of an image area picked up by the video camera 11. In addition, the fourth object 42 also moves to a side of the image area.

Figure 5:
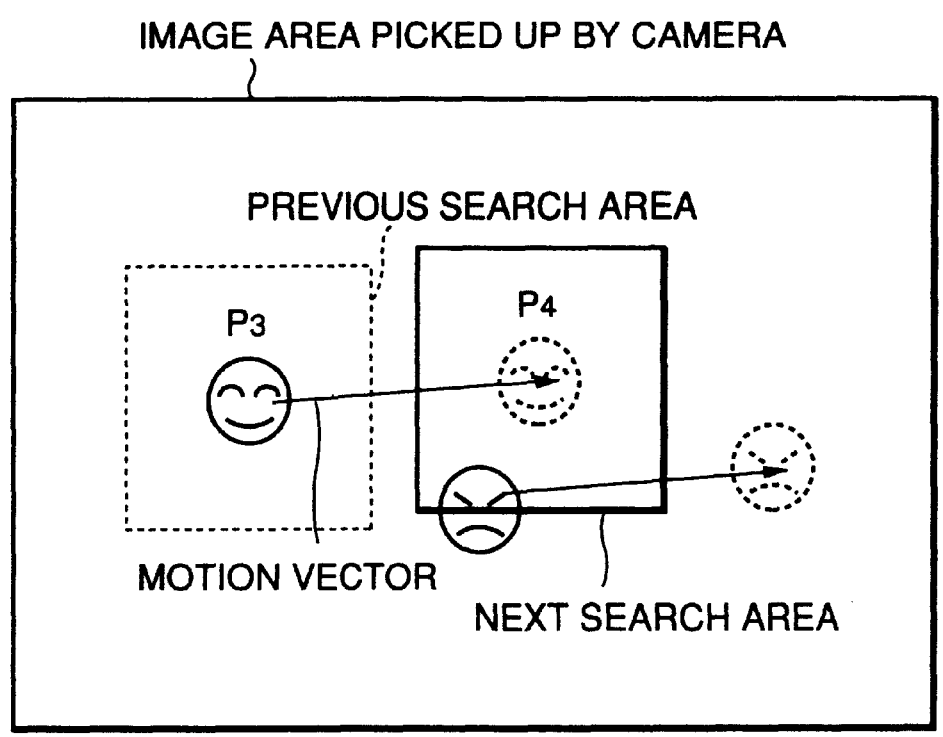
FIG. 5 shows a view for use in describing of a relationship between search areas and motion vectors extracted from an image area picked up by the camera shown in FIG. 4.

Under the circumstances, the search area controller 14 produces the area control signal representative of changing a previous search area into a next search area as shown in FIG. 5. This area control signal is introduced into the compressive encoder 13 and, thereby, the compressive encoder 13 searches or calculates a motion vector about the third object 41 between the previous search area and the next search area even when the objects, such as 41, 42, are largely moved in excess of the previous search area. Thus, the system of this invention can respond to a rotation of the camera platform 12 to search motion vectors within a suitable search area.

Herein, it is noted that, in the above-mentioned conventional techniques, a previous search area is kept unchanged as the predetermined search area even if the camera platform 12 rotates as described above. That is, the conventional techniques inevitably executes compressive-encoding of an Intra-coded picture without motion compensation in the above-mentioned case. On the other hand, the system of this invention can execute the compressive-encoding with motion compensation.

Figure 6:
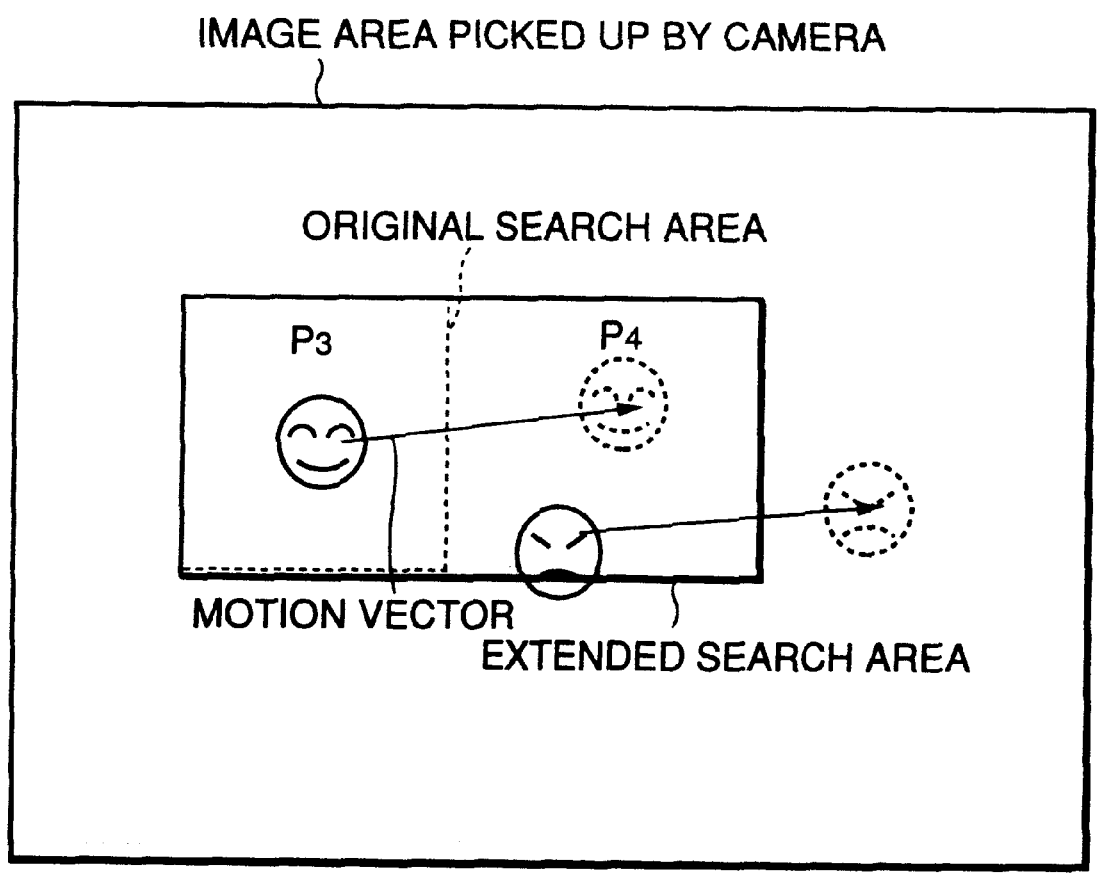
FIG. 6 shows a view for use in describing of another relationship between search areas and motion vectors within an image area picked up by the camera shown in FIG. 4.

Instead of the above manner, it may be adopted that the search area is extended in consideration of movement of the video camera 11 as shown in FIG. 6.

In this event, the search area controller 14 produces the area control signal representative of widening an original search area as the above predetermined search area into an extended search area as depicted in FIG. 6. Like in FIG. 5, the area control signal is introduced into the compressive encoder 13 and, thereby, the compressive encoder 13 searches or calculates a motion vector about the third object 41 within the extended search area. Thus, the system of this invention can respond to a movement of the camera platform 12, namely, a variation of an image area picked up by the video camera 11. Herein, it is also noted that the above-mentioned conventional techniques cannot widening the search area and, therefore, cannot search the motion vector. That is, in the above case, the conventional techniques inevitably executes compressive-encoding of an Intra-coded picture. On the other hand, the system of the present invention can execute the compressive-encoding with motion compensation.

Now, detail explanation will be made about the concept of this invention with a specific example.

Figure 7:
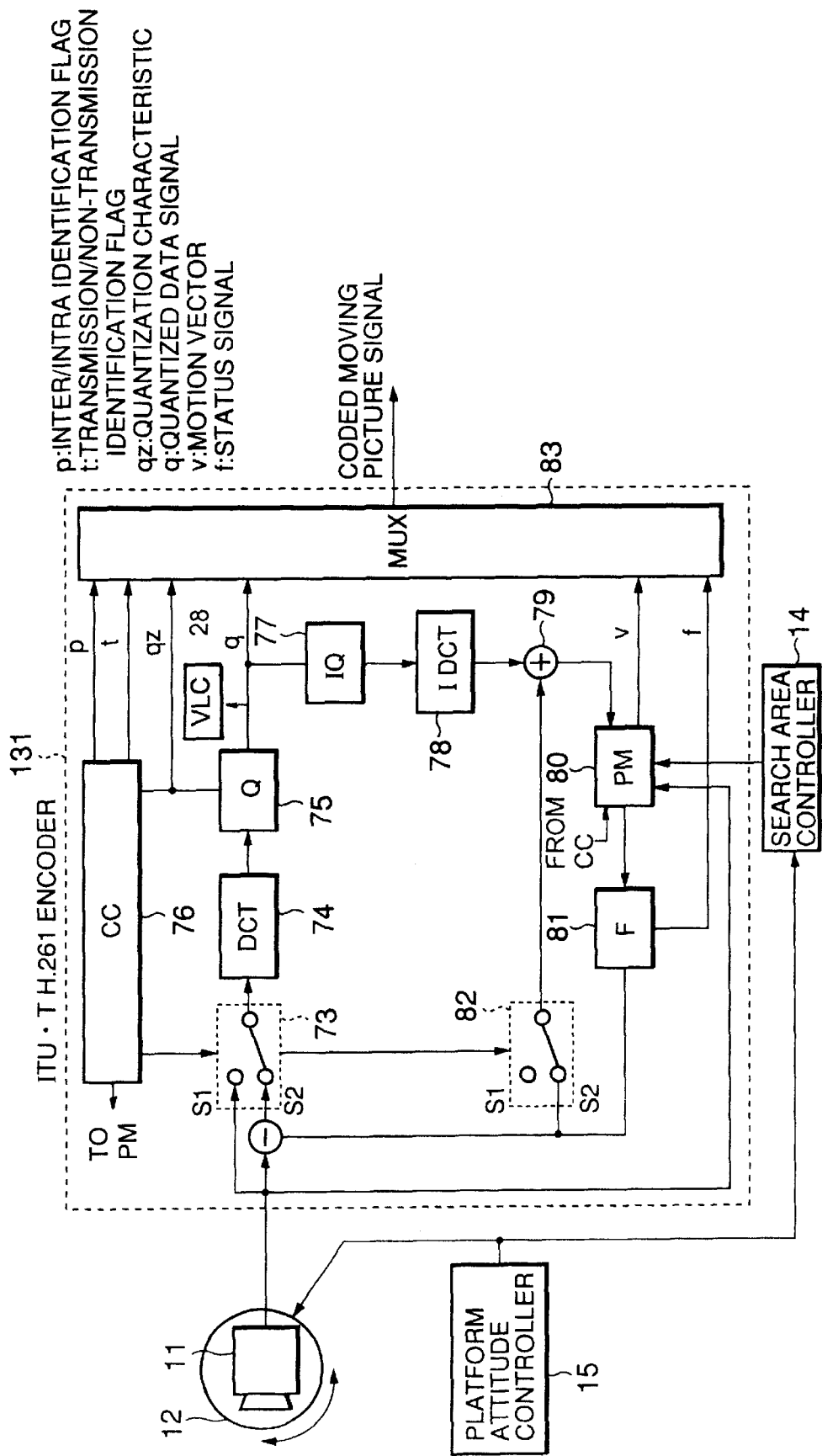
FIG. 7 shows a block diagram of a moving picture compressing system according to a concrete example of this invention.

Referring to FIG. 7, a moving picture compressing system according to the specific example has an ITU-T H.261 encoder 131 as the compressive encoder 13 in FIG. 1.

More specifically, the ITU-T H.261 encoder 131 illustrated in FIG. 7 has a coding controller (CC) 76 which is operable on the basis of the video signal from the video camera 11 and which delivers a mode switching signal representative of switching between Inter/Intra modes to first and second switches 73 and 82. In addition, the illustrated CC 76 is connected to a multiplexer (MUX) 83 and is also connected to a prediction memory (PM) 80. Besides, the CC 76 sends, into the MUX and PM, a flag p which serves to distinguish between Inter- and Intra-identification flags and which may be simply referred to as a first identification flag, at each macro-block. Furthermore, the CC 76 transmits, to both the MUX 83 and a quantizer (Q) 75, information qz which is representative of a quantization characteristic and may be simply referred to as quantization information. Besides, the CC 76 transmits, to the MUX 83, a flag t which serves to distinguish between transmission- and non-transmission-identification flags and which may be simply referred to as a second identification flag.

Herein, a succeeding description will be made about operation of the specific example depending on the first identification flag.

At first, it is assumed that the CC 76 outputs the first identification flag representative of the Intra-identification flag. In this event, the first and second switches are all switched to an input terminal S1. Then, the video signal from the video camera 11, in each macro-block, is subjected to discrete cosine transform in a transformer (DCT) 74, is further subjected to quantization in the Q 75, and, thereby, is changed into a quantized data signal. In this connection, the Q 75 also produces a quantization factor. The quantized data signal and the quantization factor are both introduced into both the MUX 83 and an inverse quantizer (IQ) 77.

The quantized data signal is subjected to inverse quantization in the IQ 77, is continuously subjected to inverse discrete cosine transform in an inverse transformer (IDCT) 78, and is changed into an inverse transformed data signal. The inverse transformed data signal passes through an adder 79 and is supplied to the PM 80 as it stands because the second switch 82 is switched to the input terminal S1.

In the PM 80, the inverse transformed data signal is stored as a reference frame data signal in a reference frame memory (not shown) included in the PM 80 at each macro-block. Herein, the PM 80 does not search or calculate motion vector when the CC 76 transmits the first identification flag representative of the Intra-identification flag. Thus, in this case, operation is carried out without depending on the area control signal from the search area controller 14.

Next, it is assumed that the CC 76 produces the first identification flag representative of the Inter-identification flag. In this event, each of the first and second switches is switched to another input terminal S2. Then, the video signal from the video camera 11, in each macro-block, is introduced into the PM 80. The PM 80 compares the video signal from the video camera 11 with the reference frame data signal stored in the reference frame memory at each macro-block to calculate motion vectors about each macro-block. Herein, an area of the reference frame data signal is controlled by the area control signal. That is, the area of the reference frame data signal is equal to the search area in this example and is extended or moved in a manner mentioned above. Thus, the PM 80 searches or calculates the motion vectors within a suitable search area controlled by the search area controller 14 and, after that, transmits each macro-block data signal to a filter (F) 81. Herein, the filter (F) 81 is positioned within a loop formed in the encoder 131 and may be simply called a filter 81 hereinafter.

The filter 81 filters each macro-block data signal and then supplies the filtered data signal to a subtracter 72 and the second switch 82. Furthermore, the filter 81 transmits, to the MUX 83, a status signal representative of status of the filter 81.

The subtracter 72 subtracts the filtered data signal from the video signal and transmits a difference as a subtracted data signal to the first switch 73.

The first switch 73 delivers the subtracted data signal to the DCT 74. The DCT 74 executes discrete cosine transform for the subtracted data signal to produce a transformed data signal. Responsive to the transformed data signal, the Q 75 executes quantization of the transformed data signal to produce a quantized data signal. This quantized data signal is introduced to both the IQ 77 and the MUX 83. Receiving the quantized data signal, the IQ 77 executes inverse quantization of the quantized data signal to produce an inverse quantized data signal. The inverse quantized data signal is introduced into the IDCT 78, is further subjected to inverse discrete cosine transform in the IDCT 78, and is transmitted as an inverse transformed data signal to the adder 79. Responsive to the inverse transformed data signal, the adder 79 the inverse transformed data signal and a data signal passing through the second switch 82 to produce the reference frame data signal. The PM 80 stores the reference frame data signal into the reference frame memory included in the PM 80 and will utilize the reference frame data signal in calculation of motion vectors.

In both of the cases mentioned above, the MUX 83 receives the first and second identification flags and the quantization information which are all sent from the CC 76, the quantized data signal and quantization factor both of which are sent form the Q 75, motion vectors sent from the PM 80, and the status signal sent from the filter 81. The illustrated MUX84 multiplexes them to produce the coded moving picture signal.

What is claimed is:

1. A video compression system comprising:
    a video camera that produces a video signal representing a sequence of images;
    an adjustable attitude camera platform for mounting the video camera;
    a compressive encoder responsive to the video signal to perform compressive encoding thereon, the compressive encoder including a motion compensation circuit which computes motion vectors within a search area;
    a platform attitude controller operative to generate a platform attitude control signal for the camera platform;
    a search area controller responsive to the platform attitude control signal to generate a search area control signal, the motion compensation circuit being responsive to the search area control signal to adjust the search area in which the motion vector computation is performed.

2. A video compression system as described in claim 1, further including:
    a positioning mechanism responsive to the attitude control signal for changing the attitude of the camera platform.

3. A video compression system as described in claim 2, wherein the positioning mechanism is operative to rotate the camera platform around a first axis to pan the camera field of view, and also to rotate the camera platform around a second axis orthogonal to the first axis.

4. A video compression system as described in claim 1, wherein the search area controller is responsive to the search area control signal to adjust the size of the search area.

5. A video compression system as described in claim 1, wherein the search area controller is responsive to the search area control signal to adjust the position of the search area.

6. A video compression system for a video camera mounted on an adjustable attitude camera platform, the camera being operative to generate a video signal representing a sequence of images, and the attitude of the camera platform being adjustable in response to a platform attitude control signal, the video compression system being comprised of:
    a compressive encoder responsive to a video signal to perform compressive encoding thereon, the compressive encoder including a motion compensation circuit which computes motion vectors within a search area;
    a platform attitude controller operative to generate a platform attitude control signal for the camera platform;
    a search area controller responsive to the platform attitude control signal to generate a search area control signal, the motion compensation circuit being responsive to the search area control signal to adjust the search area in which the motion vector computation is performed.

7. A video compression system as described in claim 6, further comprising:
    a platform positioning mechanism responsive to the attitude control signal for changing the attitude of the platform.

8. A video compression system as described in claim 7, wherein the search area controller is responsive to the search area control signal to adjust the size of the search area.

9. A video compression system as described in claim 7, wherein the search area controller is responsive to the search area control signal to adjust the position of the search area.

10. A video compression method for encoding a succession of video images produced by a video camera, the camera being mounted on a movable platform which is responsive to an attitude control signal to effect changes in camera attitude, the method comprising:
    performing compressive coding on the succession of video images;
    performing motion compensation by computing motion vectors within an adjustable search area for the succession of images;
    generating a platform attitude control signal to effect changes in camera attitude; and
    adjusting the search area in accordance with the attitude control signal.

11. A video compression method as described in claim 10, wherein the search area is adjusted to control the size thereof.

12. A video compression method as described in claim 10, wherein the search area is adjusted to control the position thereof.

* * * * *